Aug. 2, 1966　　　W. B. CONRAD　　　3,263,948
FITTING FOR A FLEXIBLE CONDUIT
Filed Dec. 18, 1964　　　2 Sheets-Sheet 2
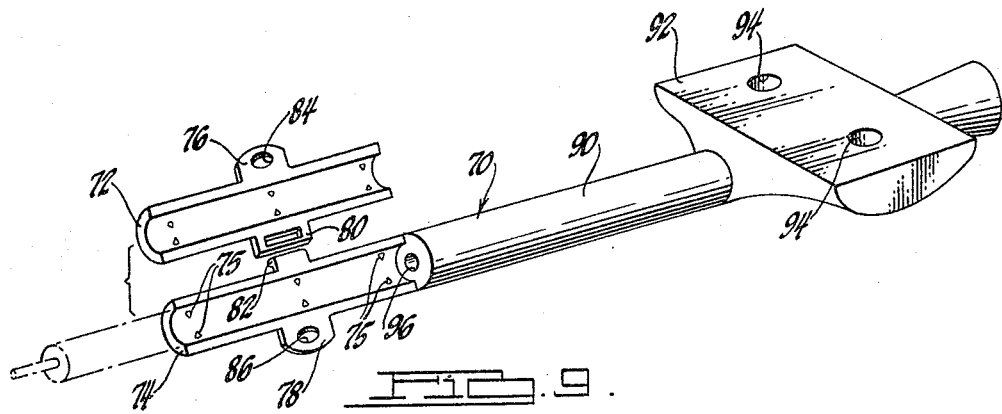
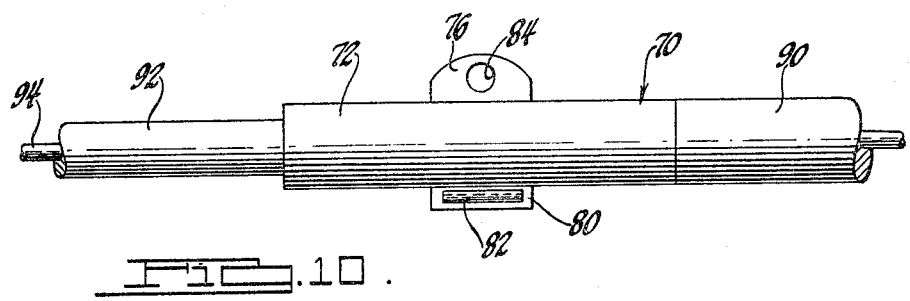
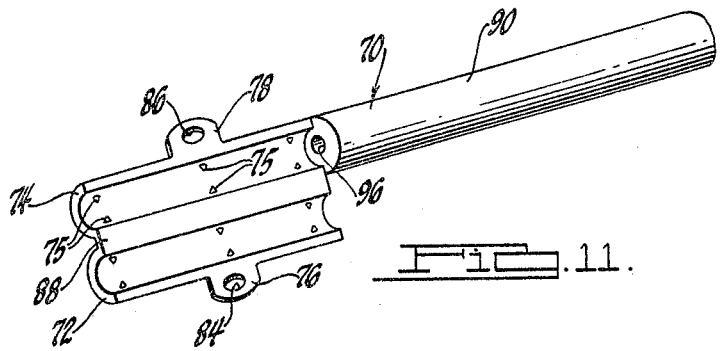
INVENTOR.
Winthrop B. Conrad
BY
Barnard, McGlynn & Reising
ATTORNEYS

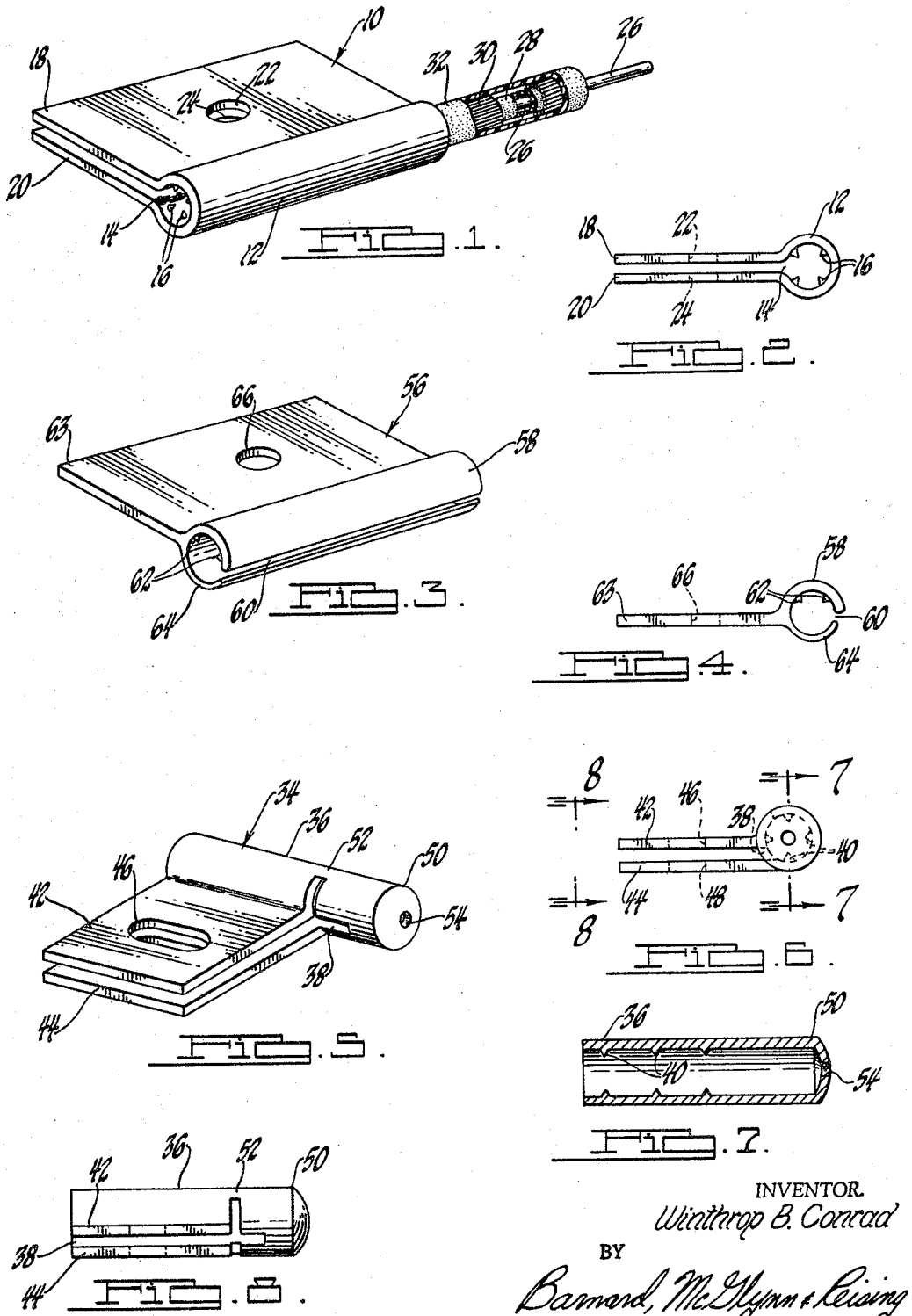

United States Patent Office 3,263,948
Patented August 2, 1966

3,263,948
FITTING FOR A FLEXIBLE CONDUIT
Winthrop B. Conrad, Franklin, Mich., assignor to Teleflex, Inc., North Wales, Pa., a corporation of Delaware
Filed Dec. 18, 1964, Ser. No. 419,382
22 Claims. (Cl. 248—74)

This invention relates to a fitting for supporting a conduit and more particularly to a fitting for supporting a portion of a conduit of the type having a plastic casing and surrounding a movable core element whereby the fitting engages and grips such a conduit to prevent relative axial movement between the conduit and the fitting while maintaining the conduit substantially free of radial forces to prevent the conduit from interfering with the movement of the core element.

Conduits of the type to which the instant invention pertains are typically used in marine, aircraft, and automotive installations. Such a conduit is usually used as a guide for a movable core element where the movable core element is used as a control member. For example, such conduits are used as guides for control assemblies utilized in automobiles to control such things as vents and heaters. The conduit is secured to the support structure of the automobile and the movable core element is movable within the conduit to control a heater or vent or the like. One such conduit typically used in such installations comprises a tubular element wrapped by a plurality of helically wound wires with a plastic casing surrounding the wires. The fittings which have been proposed for use with such plastic encased conduits have not proved entirely satisfactory.

When a fitting is used to support such conduits, the fitting must not apply excessive radial forces to the conduit. If a fitting which supports a conduit subjects the conduit to excessive radial forces, the conduit will be deformed and come in contact with the movable core element to interfere with its movement. In addition, the fitting must engage the conduit so as to prevent relative axial movement of the conduit within the fitting to prevent the conduit from being pulled from the fitting. Furthermore, when a fitting is utilized to support a plastic encased conduit of the type utilizing a plurality of wires helically wound around an inner tubular element, the fitting must, in addition to maintaining the conduit substantially free of radial forces and preventing axial movement of the conduit within the fitting, allow movement of the individual wires relative to one another and relative to the inner tubular element and the outer plastic casing so that the conduit is flexible along its entire length.

Fittings which have been proposed for use with such conduits have been generally of two types. The first type is a fitting having surfaces which tightly engage the conduit and the second type is a fitting made of plastic and bonded to a plastic casing of the conduit. The fittings which support a conduit by tightly engaging the conduit are not satisfactory since in order to prevent axial movement between the fitting and the conduit they apply excessive radial forces to the conduit which tend to deform the conduit so that it interferes with movement of the inner core element. Furthermore, the problem is not solved by utilizing plastic fittings which are molded to the conduit, since such molded fittings cannot be utilized in all environments. These plastic fittings are molded to the conduit in such a manner that a chemical bond is formed between the fitting and the plastic casing of the conduit thereby to secure the plastic fitting to the conduit without impairing the function of the conduit. This procedure, however, is not a possible solution in all cases for a variety of reasons. First, the fitting must be made of a plastic material which is chemically compatible for bonding to the plastic casing of the conduit and this is not always possible. Secondly, there are situations where a particular plastic can be bonded to the plastic casing but it does not possess the strength requisites to secure the conduit to a support structure. For example, a plastic fitting may be bonded to a plastic conduit casing and have a flange with a hole in it to receive a screw or bolt to secure the fitting to a support, yet the plastic may not be strong enough to receive the compressive forces which are necessarily exerted against the flange by the head of the bolt or screw. Consequently, fittings which tightly clamp the conduits cannot be utilized and the plastic fittings which are bonded to the plastic casing of the conduits cannot be utilized in all instances.

Accordingly, it is an object and feature of this invention to provide a fitting to engage a conduit to maintain the conduit substantially free of radial forces to prevent said conduit from deforming and which will not allow relative axial movement between the conduit and the fitting.

Yet another object and feature of the instant invention is to provide a fitting for supporting a portion of a conduit of the type having a plastic casing and surrounding a movable core element for engaging and gripping the conduit to prevent relative axial movement between the conduit and the fitting, and to maintain the conduit in the fitting substantially free of radial forces which would cause the conduit to deform and interfere with the movement of the core element.

In general, these and other objects of this invention are attained by various embodiments having means with two portions movable relative to each other for engaging a conduit with spikes disposed on at least one of the portions, and may include positioning means for maintaining the portions in engagement with the conduit. The positioning means may be used to move the two portions relative to one another to engage a conduit, and to hold the portions in engagement with the conduit, without subjecting the conduit to excessive radial forces. The spikes pierce or penetrate the conduit without subjecting the conduit to radial forces for preventing relative axial movement of the conduit within the fitting to prevent the conduit from being pulled from the fitting.

Other objects and attendant advantages of the present invention will be readily appreciated as the same becomes better understood by reference to the following detailed description when considered in connection with the accompanying drawings wherein:

FIGURE 1 is a perspective view of one embodiment;
FIGURE 2 is an end view of the embodiment of FIGURE 1;
FIGURE 3 is a perspective view of another embodiment;
FIGURE 4 is an end view of the embodiment shown in FIGURE 3;
FIGURE 5 is a perspective view of another embodiment;
FIGURE 6 is an end view of the embodiment shown in FIGURE 5;
FIGURE 7 is a cross-sectional view taken along line 7—7 of FIGURE 6;
FIGURE 8 is an elevational view taken along line 8—8 of FIGURE 6;
FIGURE 9 is a perspective view of another embodiment;
FIGURE 10 is an elevational view of the embodiment of FIGURE 9; and
FIGURE 11 is a perspective view of another embodiment.

Referring now to the drawings, there is shown in FIGURES 1 and 2 a fitting, generally indicated at 10. The fitting 10 is shown in engagement with a conduit. As alluded to previously, the fitting of the present invention is particularly suitable for use with a conduit surrounding a movable core element wherein the conduit comprises metal wires helically wound about an inner tubular element with a plastic casing surrounding the wires. Such a conduit is shown in FIGURE 1 surrounding a movable core element 26. The conduit comprises an inner tubular element 28, preferably made of plastic, a plurality of wires 30 helically wound about the inner tubular element 28, and an outer plastic casing 32.

The fitting 10 comprises a means for engaging at least a portion of a conduit and gripping means to secure the conduit in the engaging means for preventing relative axial movement between the conduit and the fitting 10 and for maintaining the conduit substantially free of radial forces. The means for engaging a conduit comprises a tubular member 12, which has a slot 14 therethrough and extending longitudinally therealong. The tubular member 12 has an inner surface having two portions, one on each side of the slot 14, which are movable relative to each other to engage a conduit. That is to say, the inner surface of the tubular member 12 is circular and presents opposing arcuate portions so that the spikes 16 disposed on the respective portions extend substantially in opposite directions toward one another and may be moved apart due to the slot 14 for inserting the conduit 32 into the tubular member 12. The gripping means comprises a plurality of spikes 16 disposed within the tubular member 12 and may, in addition, comprise positioning means for maintaining the tubular member 12 in engagement with the conduit. The spikes 16 penetrate the plastic casing 32 without subjecting the conduit to radial forces but prevent relative axial movement of the conduit within the fitting. The spikes 16 may penetrate the plastic casing and separate two adjacent wires 30 without subjecting the conduit to excessive radial forces which would deform the conduit. This action will allow the respective wires 30 to move relative to each other, relative to the inner tubular element 28, and relative to the outer plastic casing 32 to allow the conduit to be flexible along its entire length. The positioning means takes the form of a pair of flanges 18 and 20 respectively connected to the tubular member 12 on each side of the slot 14. The flanges 18 and 20 may be moved apart to expand the tubular member 12 for inserting a conduit therein, and may be moved together for maintaining the tubular member 12 in engagement with the conduit. The flanges 18 and 20 also have means for securing flanges together and which also may be used to secure the flanges, and therefore the fitting, to a support structure. Such means takes the form of holes 22 and 24 in the respective flanges 18 and 20 and may be utilized for the insertion of a screw or bolt to hold the flanges together and to secure the flanges to a support structure.

There is shown in FIGURES 5 through 8 a fitting, generally indicated at 34, which is similar to the fitting shown in FIGURES 1 and 2, but which is particularly adaptable for supporting the end of a plastic coated conduit. The fitting 34 also utilizes means for engaging a conduit, which means has a surface with portions which are movable relative to each other. The conduit engaging means comprises a tubular member 36 having a slot 38 through the wall thereof and extending longitudinally therealong. The tubular member 36 has an inner surface having two portions, one on each side of the slot 38, which are movable relative to each other to engage a conduit. The fitting 34 also utilizes gripping means which comprises the spikes 40, and may, in addition, include positioning means comprising the flanges 42 and 44. The flanges 42 and 44 are respectively connected to the tubular member 36 on each side of the slot 38. The flanges 42 and 44 may be moved apart to expand the tubular member 36 for allowing a conduit to be inserted therein, and may be moved together for maintaining the tubular member 36 in engagement with the conduit. The flanges 42 and 44 have means comprising the holes 46 and 48 for securing the flanges together and which may also be used to secure the flanges to a support structure. The fitting 34 also includes a cap 50 connected to the tubular member 36 about a portion of one end of the tubular member, as at 52. A hole 54 is provided in the end of the cap 50 for extending a core element therethrough. The fitting 34 is particularly adaptable for use with the end of a conduit which has a movable core element therein since the end of the conduit may be positioned in the tubular member 36 and the core element may be movably supported in the hole 54.

Another fitting is shown in FIGURES 3 and 4 which utilizes conduit engaging means and gripping means for preventing relative axial movement between the fitting and the conduit and for maintaining the conduit substantially free of radial forces. The fitting, generally shown at 56 in FIGURE 3, utilizes conduit engaging means which takes the form of a tubular member 58 which has a slot 60 therethrough and extending longitudinally therealong. The tubular member 58 utilizes gripping means which comprises the spikes 62. The tubular member 58 has a thin resilient portion 64 adjacent the slot 60 and which may be moved away from the remainder of tubular member 58 to allow a conduit to be inserted within the tubular member and which will, upon release, maintain the tubular member 58 in engagement with the conduit. The tubular member 58, therefore, has an inner surface with two portions which are movable relative to each other for engaging a conduit therebetween. A flange 63 is connected to the tubular member 58 and has means taking the form of a hole 66 for securing the flange, and consequently the fitting 56, to a support.

The fitting shown in FIGURES 9 through 11 is particularly suitable as an end support fitting for a conduit having a movable core element therein. The fitting, generally shown at 70, utilizes means having portions which are movable relative to each other to engage a conduit. The means for engaging a conduit takes the form of a pair of arcuate conduit engaging members 72 and 74. The fitting 70 also utilizes gripping means comprising the spikes 75 and positioning means comprising the flanges 76 and 78 for maintaining the conduit engaging members in engagement with a conduit. The means for engaging a conduit also includes a hinge means hinging the members 72 and 74 together so that they may move relative to each other to engage the conduit.

In the fitting of FIGURES 9 and 10, the hinge means comprises a female hinge element 80 and a male hinge element 82. The male hinge element 82 may be inserted into the female hinge element 80 to maintain the conduit engaging members 72 and 74 together and to allow relative movement between the members 72 and 74. The flanges 76 and 78 are respectively attached to the respective conduit engaging members 72 and 74 and have means taking the form of holes 84 and 86 to secure the flanges together.

The fitting shown in FIGURE 11 utilizes a different hinge means for hinging the conduit engaging members 72 and 74 together for movement relative to each other. The hinge means in the embodiment of FIGURE 11 comprises a membranous member 88 interconnecting the conduit engaging members 72 and 74. The membranous member 88 maintains the conduit engaging members 72 and 74 together and allows relative movement between the members so that they may engage a conduit.

As alluded to previously, the fitting 70, shown in FIGURES 9 through 11, is particularly suitable for engaging and supporting the end of a conduit which has a movable core element therein. One of the conduit engaging members 74 is shown connected to or integral with a support member 90. The fitting 70 supports the end of a conduit 92 through the conduit engaging members 72 and 74. The support member 90 has a bore 96 therethrough for supporting a movable core element. The fitting 70 may be utilized as an end support fitting for a conduit by placing the end of a conduit within and adjacent one end of the conduit engaging members 72 and 74 with the core element extending through the bore 96. The support member 90 may have any appropriate means for attachment to a support structure. As pointed out previously, conduits of the type with which the fitting of the instant invention is utilized are frequently used in control assemblies in automobile installations. The fitting of FIGURE 9 is shown in such an environment where the support member 90 has a plate element 92 for attachment to a support structure of a vehicle. For example, the plate element 92 may be attached by use of the holes 94 and suitable fasteners to the bottom of a dashboard of an automobile. The end support fitting 70, therefore, supports a core element for movement therein, and supports the end of a flexible conduit.

Obviously, many modifications and variations of the present invention are possible in light of the above teachings. It is, therefore, to be understood that within the scope of the appended claims, the invention may be practiced otherwise than as specifically described.

I claim:
1. A fitting for supporting a portion of a conduit of the type having a plastic casing and surrounding a movable core element, said fitting comprising; a pair of conduit engaging members, hinge means hinging said conduit engaging members together for movement relative to each other to engage such a conduit therebetween, a plurality of spikes disposed on said conduit engaging members for penetrating such a plastic casing to secure such a conduit in said conduit engaging members to prevent relative axial movement between the conduit and said conduit engaging members; and for maintaining the conduit substantially free of radial forces to prevent the conduit from interfering with the movement of the core element, and positioning means for maintaining said conduit engaging members in engagement with such a conduit.

2. A fitting as set forth in claim 1 wherein one of said conduit engaging members has a support member for attachment to a support structure, and said support member having a bore therethrough whereby one end of such a conduit may be engaged by said conduit engaging members and such a core element may extend through said bore.

3. A fitting as set forth in claim 1 wherein said positioning means comprises; a flange on each respective conduit engaging member for movement together for maintaining said conduit engaging members in engagement with such a conduit, and said flanges having means for securing said flanges together.

4. A fitting as set forth in claim 3 wherein said hinge means comprises a female hinge element on a first of said conduit engaging members, and a male hinge element on the second of said conduit engaging members whereby said male hinge element may be inserted into said female hange element to maintain said conduit engaging members together for movement relative to and toward each other.

5. A fitting as set forth in claim 3 wherein said hinge means comprises a membranous member interconnecting said conduit engaging members to maintain said conduit engaging members together for movement relative to each other.

6. A fitting as set forth in claim 3 in combination with a conduit comprising a flexible tubular element with a plurality of wires helically wound therearound and a plastic casing surrounding said wires whereby said fitting supports said conduit while maintaining said conduit substantially free of radial forces as said spikes penetrate said plastic casing to prevent relative axial movement between said conduit and said fitting and to allow relative movement between said wires.

7. A fitting for supporting a portion of a conduit of the type having a plastic casing and surrounding a movable core element, said fitting comprising; a tubular member having a slot therethrough extending longitudinally therealong, a plurality of spikes disposed within said tubular member for piercing the plastic casing to secure such a conduit in said tubular member for preventing axial movement of the conduit relative to said tubular member and for maintaining the conduit substantially free of radial forces to prevent said conduit from interfering with the movement of said core element, and a cap connected at one end of said tubular member about at least a portion thereof, said cap positioning an end of such conduit in said tubular member and including a hole therethrough to receive and movably support such a core element.

8. A fitting for supporting a portion of a conduit of the type having a plastic casing and surrounding a movable core element, said fitting comprising a tubular member having a slot therethrough extending longitudinally therealong, a plurality of spikes disposed within said tubular member to pierce the plastic casing to secure such a conduit in said tubular member to prevent axial movement of the conduit relative to said tubular member while maintaining the conduit substantially free of radial forces which would cause said conduit to interfere with the movement of said core element, a pair of flanges respectively connected to said tubular member on each side of said slot and being movable apart to expand said tubular member to insert a conduit therein and being movable together to maintain said tubular member in engagement with the conduit, said flanges including means for securing said flanges together and for securing said flanges to a support, and a cap connected to said tubular member about at least a portion of said tubular member at one end thereof, said cap positioning an end of such conduit in said tubular member and including a hole therethrough to receive and movably support such a core element.

9. In combination, a fitting, a conduit supporting said fitting and having a penetratable casing and of the type housing a movable motion-transmitting core element, said fitting comprising a body member mounted about a lengthwise portion of said conduit and including gripping means in engagement with said conduit, said body member including said gripping means positively penetrating into the material of said conduit as a unit to prevent relative axial movement between said conduit and said fitting while maintaining said conduit substantially free of radial forces which would radially deform said conduit and interfere with movement of said core element relative thereto.

10. The invention as defined in claim 9 wherein said gripping means releasably penetrates said conduit.

11. The invention as defined in claim 9 wherein said conduit includes an outer plastic casing penetrated by said gripping means.

12. The invention as defined in claim 11 wherein said gripping means includes a plurality of spikes.

13. The invention as defined in claim 11 further comprising means carried by said body member for attaching the latter to a support structure.

14. The invention as defined in claim 9 wherein said body member includes portions movable relative to each other for engaging said conduit therebetween.

15 The invention as defined in claim 9 wherein said body member includes a cap extending over one end of said conduit, said cap having a bore extending therethrough and substantially axially aligned with one end of said conduit, said core element extending through and being movably supported within said bore.

16. The invention as defined in claim 9 wherein said body includes portions movable relative to each other for engaging said conduit therebetween, and hinge means hinging said portions together for movement relative to each other.

17. In combination, a fitting, a conduit supporting said fitting and having a penetratable casing and of the type including at least one wire extending helically therealong on a long lead and housing a movable motion-transmitting core element, said fitting comprising a body member mounted about a lengthwise portion of said conduit and including gripping means in engagement with said conduit, said body member including said gripping means positively penetrating into the material of said conduit as a unit to prevent relative axial movement between said conduit and said fitting while maintaining said conduit substantially free of radial forces which would radially deform said conduit and interfere with movement of said wire and core element relative thereto.

18. The invention as defined in claim 17 wherein said gripping means releasably penetrates said conduit.

19. The invention as defined in claim 17 wherein said conduit includes an outer plastic casing enclosing said wire and penetrated by gripping means.

20. The invention as defined in claim 19 wherein said gripping means includes a plurality of spikes.

21. The invention as defined in claim 19 wherein said gripping means includes a plurality of spikes projecting inwardly from said body member.

22. In combination, a fitting, a conduit supporting said fitting and having a penetratable casing and of the type including a plurality of wires extending helically therealong on a long lead and housing a movable motion-transmitting core element, said fitting comprising a body member mounted about a lengthwise portion of said conduit and including gripping means in engagement with said conduit, said body member including said gripping means positively penetrating into the material of said conduit as a unit to prevent relative axial movement between said conduit and said fitting while maintaining said conduit substantially free of radial forces which would radially deform said conduit and interfere with movement of said wires and core element relative thereto.

References Cited by the Examiner

UNITED STATES PATENTS

| 1,175,802 | 3/1916 | Orcutt | 248—71 |
| 2,509,445 | 5/1950 | Motis | 248—51 |
| 2,528,288 | 10/1950 | Rublee | 174—159 |
| 2,871,718 | 2/1959 | Schroeder | 74—501 |
| 2,885,538 | 5/1959 | Mahon et al. | 240—11.4 |
| 2,886,270 | 5/1959 | Wendela | 248—74 |
| 2,891,296 | 6/1959 | Darde | 24—81 |

FOREIGN PATENTS

| 1,121,357 | 4/1956 | France. |
| 1,167,605 | 8/1958 | France. |
| 839,585 | 5/1952 | Germany. |
| 792,266 | 3/1958 | Great Britain. |
| 927,731 | 6/1963 | Great Britain. |

CLAUDE A. LE ROY, *Primary Examiner.*